US012810837B2

(12) United States Patent
Hara et al.

(10) Patent No.: US 12,810,837 B2
(45) Date of Patent: Nov. 24, 2026

(54) SOUND CONTROL METHOD, SOUND CONTROL DEVICE, AND BATTERY ELECTRIC VEHICLE

(71) Applicant: TOYOTA JIDOSHA KABUSHIKI KAISHA, Toyota (JP)

(72) Inventors: Yoshikazu Hara, Atsugi (JP); Tomio Yamanaka, Nagoya (JP); Hiroshi Hiraiwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 18/916,726

(22) Filed: Oct. 16, 2024

(65) Prior Publication Data

US 2025/0157454 A1 May 15, 2025

(30) Foreign Application Priority Data

Nov. 14, 2023 (JP) ................................ 2023-193875

(51) Int. Cl.
*G10K 11/18* (2006.01)
*B60L 50/60* (2019.01)

(52) U.S. Cl.
CPC .............. *G10K 11/18* (2013.01); *B60L 50/60* (2019.02)

(58) Field of Classification Search
CPC ................................ G10K 11/18; B60L 50/60
See application file for complete search history.

(56) References Cited

U.S. PATENT DOCUMENTS 12,600,243 B1 * 4/2026 Gibson .................... B60L 8/00
2021/0229550 A1 7/2021 Isami
2022/0319491 A1 * 10/2022 Hattori .................... B60Q 9/00
2023/0016272 A1 * 1/2023 Kim ...................... B60W 40/09
2024/0083259 A1 * 3/2024 Ikezawa .................. B60L 15/20

FOREIGN PATENT DOCUMENTS

| | | | |
|---|---|---|---|
| JP | 2009-286184 | A | 12/2009 |
| JP | 2020-120290 | A | 8/2020 |
| JP | 6787507 | B1 | 11/2020 |
| JP | 2022-036827 | A | 3/2022 |
| JP | 2022-170271 | A | 11/2022 |

* cited by examiner

*Primary Examiner* — Andrew Sniezek
(74) *Attorney, Agent, or Firm* — SoraIP, Inc.

(57) ABSTRACT

A pseudo-engine sound is generated based on the operating data of battery electric vehicle manual driving elements. The pseudo-engine sound is outputted from a plurality of speakers provided in a room of battery electric vehicle. The plurality of speakers includes a first speaker provided at a front portion of battery electric vehicle and a second speaker provided at a location other than the front portion. When the pseudo engine sound is output from a plurality of speakers, the sound pressures of the pseudo engine sounds output from the first and second speakers are adjusted based on the sound image setting data in battery electric vehicle.

8 Claims, 8 Drawing Sheets

SOUND CONTROL METHOD, SOUND CONTROL DEVICE, AND BATTERY ELECTRIC VEHICLE

CROSS-REFERENCE TO RELATED APPLICATION

This application claims priority to Japanese Patent Application No. 2023-193875 filed on Nov. 14, 2023, incorporated herein by reference in its entirety.

BACKGROUND

1. Technical Field

The present disclosure relates to a technique to be applied to a battery electric vehicle that uses an electric motor as a power unit for travel.

2. Description of Related Art

Japanese Patent No. 6787507 discloses a battery electric vehicle that uses an electric motor as a power unit for travel. This conventional battery electric vehicle controls an output of the electric motor so as to simulate torque characteristics peculiar to an engine vehicle with a manual transmission (hereinafter also referred to as an "MT engine vehicle"). The output of the electric motor is controlled based on a signal from a pseudo manual transmission operated by a driver. The pseudo manual transmission has a configuration similar to that of a manual transmission mounted on an MT engine vehicle.

Japanese Unexamined Patent Application Publication No. 2020-120290 (JP 2020-120290 A) discloses a three-dimensional acoustic system that generates a three-dimensional sound field in the cabin of a vehicle. This conventional acoustic system is a system to be retrofitted to an existing speaker system in the cabin of a vehicle, and includes a three-dimensional acoustic speaker. This conventional acoustic system outputs a sound from the three-dimensional acoustic speaker in conjunction with the existing speaker system.

SUMMARY

Japanese Patent No. 6787507 does not mention a sound during the output control of the electric motor based on the manual shift operation by the driver. In this regard, if a sound that simulates an engine sound of a common engine vehicle (hereinafter also referred to as a "pseudo engine sound") is output from a speaker provided in the cabin of the battery electric vehicle, the driver can feel as if he/she were driving an engine vehicle. However, simply outputting a pseudo engine sound from a speaker may not give a sufficient ambiance to a driver that is familiar with engine vehicles.

The present disclosure has been made in view of the above issue. An object of the present disclosure is to provide a technique capable of giving a driver an ambiance by outputting a pseudo engine sound into the cabin of a vehicle capable of traveling using an electric motor.

A first aspect of the present disclosure provides a sound control method to be applied to a battery electric vehicle that uses an electric motor as a power unit for travel, characterized as follows.

The sound control method includes: generating a pseudo engine sound based on operation information for a manual driving element of the battery electric vehicle; and outputting the pseudo engine sound from a plurality of speakers provided in a cabin of the battery electric vehicle.

The speakers include a first speaker provided at a front portion of the battery electric vehicle, and a second speaker provided at a location other than the front portion.

The outputting of the pseudo engine sound further includes adjusting respective sound pressures of the pseudo engine sounds output from the first and second speakers based on sound image setting information for the battery electric vehicle.

A second aspect of the present disclosure provides a sound control device to be applied to a battery electric vehicle that uses an electric motor as a power unit for travel, characterized as follows.

The sound control device includes a processor configured to perform various processes. The processor is configured to generate a pseudo engine sound based on operation information for a manual driving element of the battery electric vehicle, and output the pseudo engine sound from a plurality of speakers provided in a cabin of the battery electric vehicle.

The speakers include a first speaker provided at a front portion of the battery electric vehicle, and a second speaker provided at a location other than the front portion.

The processor is further configured to adjust respective sound pressures of the pseudo engine sounds output from the first and second speakers based on sound image setting information for the battery electric vehicle.

A third aspect of the present disclosure provides a battery electric vehicle that uses an electric motor as a power unit for travel, characterized as follows. The battery electric vehicle includes: a plurality of speakers provided in a cabin of the battery electric vehicle; and a processor configured to perform various processes.

The processor is configured to generate a pseudo engine sound based on operation information for a manual driving element of the battery electric vehicle, and output the pseudo engine sound to the speakers.

The speakers include a first speaker provided at a front portion of the battery electric vehicle, and a second speaker provided at a location other than the front portion.

The processor is further configured to adjust respective sound pressures of the pseudo engine sounds output from the first and second speakers based on sound image setting information for the battery electric vehicle.

According to the present disclosure, when a pseudo engine sound to be output from the first and second speakers provided in the cabin of the battery electric vehicle is generated, the respective sound pressures of the pseudo engine sounds output from these speakers are adjusted based on the sound image setting information. Therefore, it is possible to enhance the ambiance due to the output as compared with the case where a pseudo engine sound is simply output from the first and second speakers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
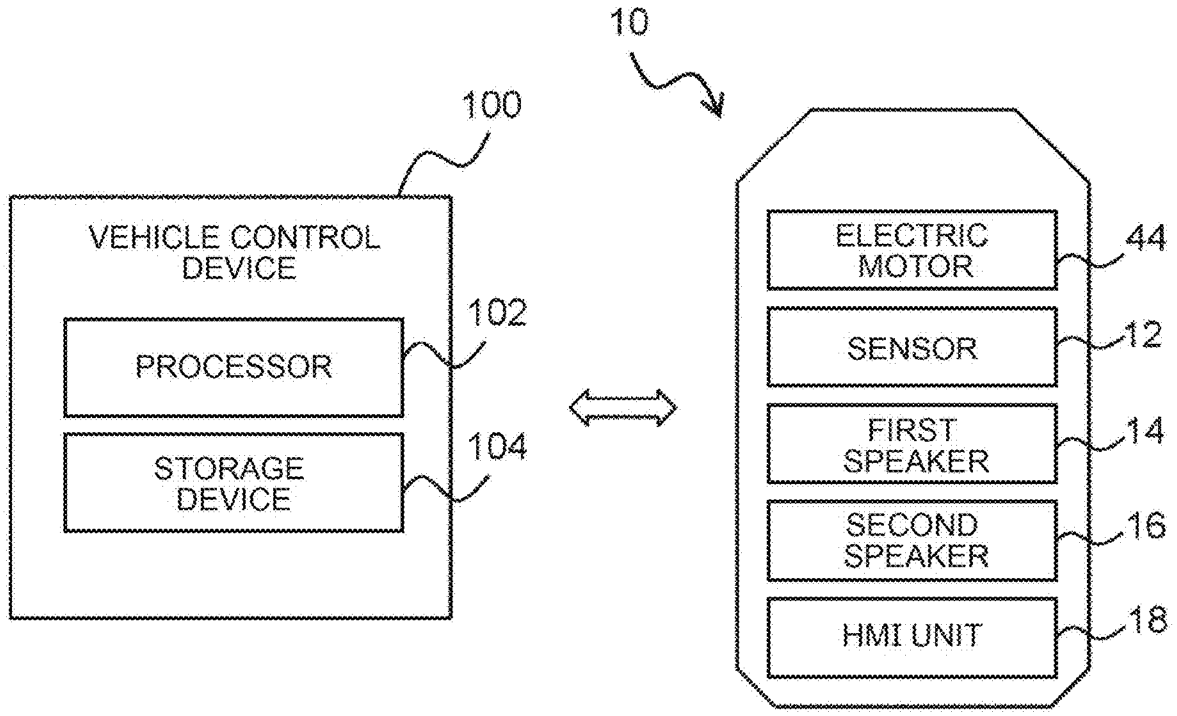
FIG. 1 is a conceptual diagram illustrating a battery electric vehicle and a sound control device according to an embodiment of the present disclosure.

Embodiments of the present disclosure will be described with reference to the accompanying drawings. In the drawings, the same or corresponding components are denoted by the same reference numerals, and the description thereof is simplified or omitted.

1. Overall Configuration and Pseudo-Engine Sound

FIG. 1 is a conceptual diagram illustrating a battery electric vehicle 10 according to an embodiment of the present disclosure and a sound control device 100 applied to battery electric vehicle 10. Battery electric vehicle 10 comprises an electric motor 44. Examples of the electric motor 44 include a brushless DC motor and a three-phase AC synchronous motor. Battery electric vehicle 10 uses the electric motor 44 as a driving power device.

Battery electric vehicle 10 also includes various sensors 12. The various sensors 12 include an operation state sensor such as an accelerator position sensor, a brake position sensor, and a shift position sensor, and a travel state sensor such as a wheel speed sensor, an acceleration sensor, and a rotation speed sensor. The accelerator position sensor detects an operation amount (accelerator operation amount) of the accelerator pedal. The brake position sensor detects an operation amount of the brake pedal. The shift position sensor detects the shift position. The wheel speed sensor detects a rotational speed of a wheel of battery electric vehicle 10. The acceleration sensor detects lateral acceleration and longitudinal acceleration of battery electric vehicle 10. The rotational speed sensor detects the rotational speed of the electric motor 44.

The various sensors 12 include position sensors such as GNSS (Global Navigation Satellite System) sensors. The various sensors 12 include recognition sensors such as cameras, radars, and LIDAR (Laser Imaging Detection and Ranging). GNSS detects the position and orientation of battery electric vehicle 10. It images at least the front of battery electric vehicle 10. The radar and LIDAR recognize conditions around battery electric vehicle 10.

Figure 2:
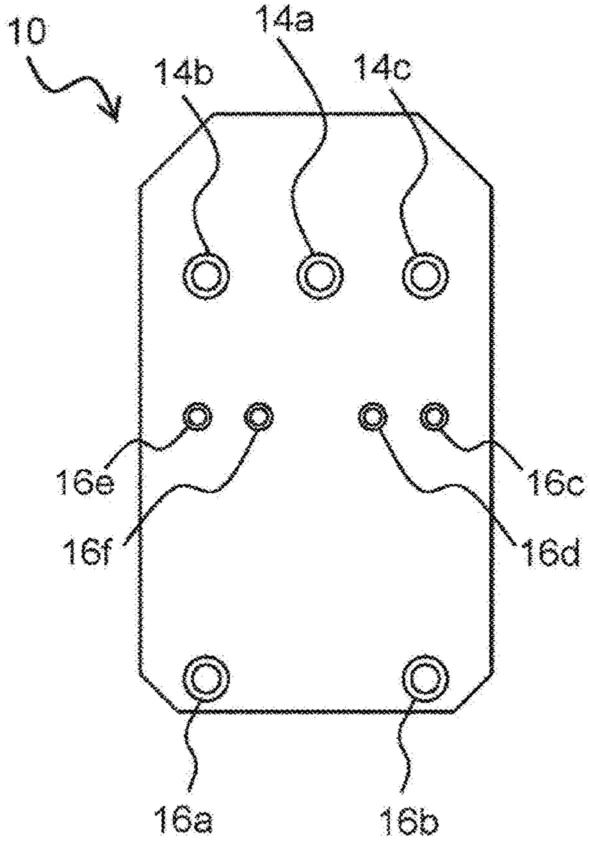
FIG. 2 is a diagram illustrating an example layout of a first speaker and a second speaker.

Battery electric vehicle 10 also includes a first speaker 14 and a second speaker 16. The first speaker 14 and the second speaker 16 output sound into battery electric vehicle 10 vehicle cabin. FIG. 2 is a diagram illustrating a layout example of the first speaker 14 and the second speaker 16. In the embodiment shown in FIG. 2, the first speaker 14 includes three front speakers 14*a*, 14*b* and a 14*c*. These front speakers are provided at the front portion of battery electric vehicle 10. The front speaker 14*a* is provided in, for example, a dashboard. The front speaker 14*b* is provided, for example, on a left-hand front door. The front speaker 14*c* is provided, for example, on the right-hand front door. The front speakers 14*a*, 14*b* and 14*c* may include a subwoofer, a mid-range speaker, a tweeter, or other speakers. The total number of speakers constituting the first speaker 14 and the layout of these speakers can be arbitrarily changed.

The second speaker 16 is a speaker provided at a place except for the front part. In the embodiment shown in FIG. 2, the second speaker 16 includes rear speakers 16*a* and 16*b*. These rear speakers are provided at the rear portion of battery electric vehicle 10. The rear speaker 16*a* is provided, for example, on the left-hand rear door. The rear speaker 16*b* is provided, for example, on the right-hand rear door. The second speaker 16 also includes seat speakers 16*c*, 16*d*, 16*e* and 16*f*. The seat speakers 16*c* and 16*d* are provided, for example, on a headrest of the driver's seat. The seat speaker 16*e* and 16*f* are provided, for example, on a headrest of a passenger seat. The rear speakers 16*a* and 16*b* and the seat speakers 16*c* to 16*f* may include a subwoofer, a mid-range, a tweeter, and other speakers. The total number of speakers constituting the second speaker 16 and the layout of these speakers can also be arbitrarily changed.

Battery electric vehicle 10 further comprises an HMI (Human Machine Interface) unit 18. HMI unit 18 is an input/output terminal for providing information to a driver of a battery electric vehicle 10 and for receiving information from the driver. HMI unit 18 includes, for example, an inputting device, a displaying device, and a microphone. Examples of the input device include a touch panel, a keyboard, a switch, and a button. The information provided to the drivers includes information about the driving condition of battery electric vehicle 10 and information specific to the present disclosure. Information specific to the present disclosure includes information on the operation mode of battery electric vehicle 10 and information on the setting of the sound image. Provision of information to the driver is performed using a display device. Information is received from the driver using an input device and a microphone.

The sound control device 100 generates sounds (hereinafter, also referred to as "indoor sounds") to be output from the first speaker 14 and the second speaker 16. The sound control device 100 also outputs the generated indoor sound from the first speaker 14 and the second speaker 16. For example, the sound control device 100 generates a pseudo engine sound as an indoor sound and outputs the pseudo engine sound from the first speaker 14 and the second speaker 16. In another example, the sound control device 100 generates an indoor sound including a pseudo engine sound, and outputs the indoor sound from the first speaker 14 and the second speaker 16.

The entire sound control device 100 may be mounted on a battery electric vehicle 10. As another example, at least a portion of the sound control device 100 may be included in an administrative server external to battery electric vehicle 10. In this case, the sound control device 100 may remotely generate the indoor sound, receive the generated indoor sound, and output the generated indoor sound from the first speaker 14 and the second speaker 16.

Generally, the sound control device 100 includes at least one processor 102 and at least one storage device 104. The processor 102 executes various processes. Examples of the processor 102 include CPU (Central Processing Unit), GPU (Graphics Processing Unit), ASIC (Application Specific Integrated Circuit), FPGA (Field-Programmable Gate Array), and the like. The storage device 104 stores various types of information. Examples of the storage device 104 include volatile memory, non-volatile memory, HDD (Hard Disk Drive), SSD (Solid State Drive), and the like.

Figure 3:
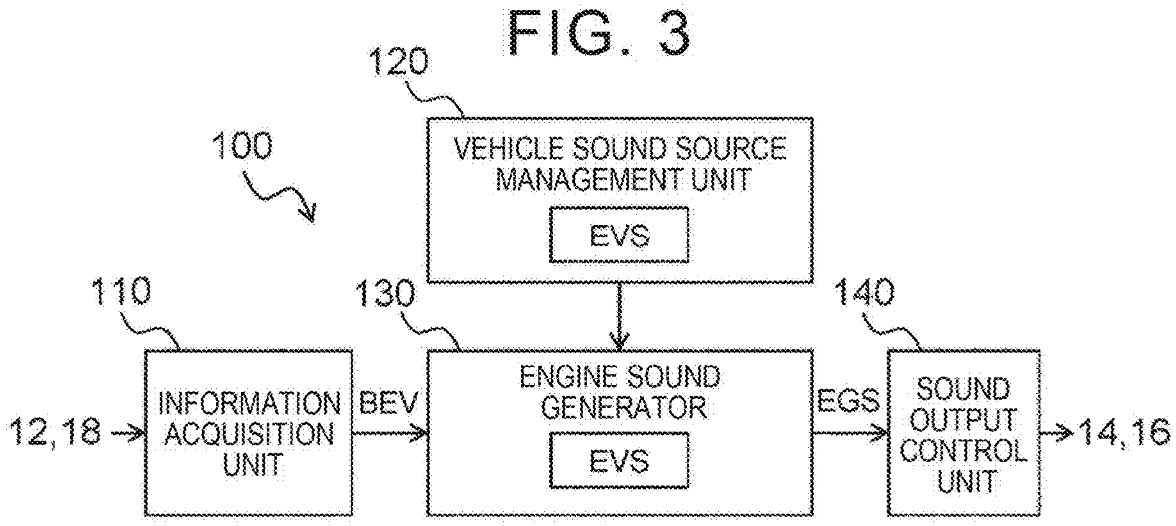
FIG. 3 is a block diagram illustrating an example of a basic functional configuration of a sound control device.

FIG. 3 is a block diagram illustrating an example of a basic functional configuration of the sound control device 100. The sound control device 100 includes, as functional blocks, an information acquisition unit 110, a vehicle sound source management unit 120, an engine sound generation unit 130, and a sound output control unit 140. These functional blocks are realized by, for example, cooperation of the processor 102 and the storage device 104.

The information acquisition unit 110 acquires information BEV related to battery electric vehicle 10. The information BEV includes information on a driving condition of battery electric vehicle 10, information on a driving environment of battery electric vehicle 10, and input information from drivers of battery electric vehicle 10. The information BEV is typically detected by the various sensors 12 and HMI unit 18. A part of the information regarding the driving environment of battery electric vehicle 10 may be acquired by combining information (for example, position information of battery electric vehicle 10) detected by the various sensors 12 with the map data.

The information BEV also includes a virtual engine speed Ne. Here, it is assumed that battery electric vehicle 10 uses the virtual engine as a driving power device. The virtual engine speed Ne is a rotational speed of the virtual engine when battery electric vehicle 10 is assumed to be driven by the virtual engine. For example, the information acquisition unit 110 may calculate the virtual engine speed Ne so as to increase as the wheel speed increases. In addition, when battery electric vehicle 10 includes the manual mode described later, the information acquisition unit 110 may calculate the virtual engine speed Ne in the manual mode based on the wheel speed, the overall reduction ratio, and the slip-rate of the virtual clutch. The method of calculating the virtual engine speed Ne will be described later.

The vehicle sound source management unit 120 stores sound source data EVS of the engine vehicle used for generating the pseudo engine sound. The vehicle sound source management unit 120 is mainly implemented by the storage device 104. Typically, the sound source data EVS includes a plurality of types of sound source data. The plurality of types of sound source data include, for example, sound source data of sound caused by engine combustion (for low rotational speed, for medium rotational speed, and for high rotational speed), sound source data of sound caused by operation of an input device such as a gear (for low rotational speed, for medium rotational speed, and for high rotational speed), sound source data of engine intake sound, sound source data of engine exhaust sound, sound source data of noise sound, sound source data of event sound (for example, engine stall sound), and the like. Each sound source data is generated in advance through a simulation based on an engine model and a vehicle model of the engine vehicle, or the like. Each sound source data is flexibly adjustable. That is, at least one of the sound pressure and the frequency of the sound indicated by the sound source data can be flexibly adjusted.

The engine sound generation unit 130 (engine sound simulator) is a simulator that generates a pseudo engine sound. The engine-sound generating unit 130 acquires at least a part of the information BEV from the information acquisition unit 110. In particular, the engine sound generation unit 130 acquires information on the virtual engine speed Ne and the vehicle speed from the information acquisition unit 110. Further, the engine sound generation unit 130 reads the sound source data EVS of the engine vehicle from the vehicle sound source management unit 120. Then, the engine sound generation unit 130 combines one or more sound source data included in the sound source data EVS of the engine vehicle to generate a pseudo-engine sound according to battery electric vehicle 10 operating conditions (virtual engine speed Ne and vehicle speed). The engine sound data EGS is data indicating the generated pseudo-engine sound.

Note that the generation of the pseudo-engine sound is a well-known technique, and the generation method of the pseudo-engine sound applicable to the present disclosure is not particularly limited. For example, a pseudo engine sound may be generated by a well-known engine sound simulator employed in a game or the like. The method of generating the pseudo engine sound may be a method of increasing or decreasing the frequency of the pseudo engine sound in proportion to the virtual engine speed Ne and increasing or decreasing the sound pressure of the pseudo engine sound in proportion to the virtual engine torque by using a map of the virtual engine speed Ne-frequency and a map of the virtual engine torque-sound pressure.

The sound output control unit 140 receives the engine sound data EGS generated by the engine sound generation unit 130. Then, the sound output control unit 140 outputs the engine sound data EGS to the speaker 16. At the time of outputting the engine sound data EGS, the sound output control unit 140 controls the sound output control unit 140 to control the sound pressure of the pseudo engine sound by controlling the amplifier. In addition, the sound-output control unit 140 changes the frequency of the pseudo-engine sound by controlling FMC (frequency modulator).

Figure 4:
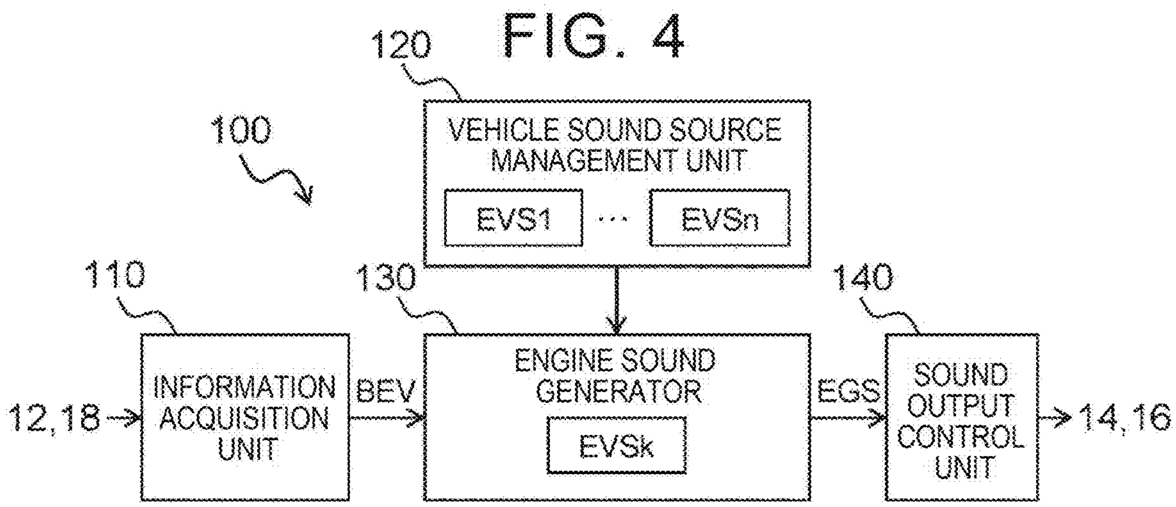
FIG. 4 is a block diagram illustrating another example of the basic functional configuration of the sound control device.

FIG. 4 is a block diagram illustrating another example of the basic functional configuration of the sound control device 100. In the embodiment illustrated in FIG. 4, the vehicle sound source management unit 120 stores sound source data EVS (EVS1, . . . EVSn) of a plurality of types of engine vehicles corresponding to each of a plurality of vehicle types (1, . . . , n). That is, the vehicle sound source management unit 120 stores the sound source data EVS of the engine vehicle for each vehicle type. The sound source data EVSk ($1 \leq k \leq n$) is generated in advance based on the engine model or the vehicle model of the vehicle type corresponding to the sound source data. The driver may designate a desired vehicle type from among a plurality of vehicle types. In this case, the sound generation unit 130 acquires the sound source data EVSk corresponding to the vehicle type designated by the drivers. Then, the engine sound generation unit 130 generates a pseudo-engine sound using the acquired sound source data EVSk of the engine vehicles. This allows the driver to feel as if he or she is driving his or her favorite vehicle type.

2. Adjusting the Sound Pressure of a Simulated Engine Sound

When the pseudo engine sound is outputted from the first speaker 14 and the second speaker 16, the driver of battery electric vehicle 10 is provided with a sense of realism such as driving an actual engine vehicle. However, simply outputting the pseudo engine sound from these speakers may not provide a sufficient sense of presence to a driver who is familiar with the engine vehicle. Therefore, in the embodiment, the respective sound pressures of the pseudo engine sounds output from the first speaker 14 and the second speaker 16 are adjusted. By adjusting the sound pressure, the driver can easily recognize the direction of the sound source. Therefore, the sense of presence can be enhanced as compared with the case where the pseudo engine sound is simply output from the first speaker 14 and the second speaker 16.

Figure 5:
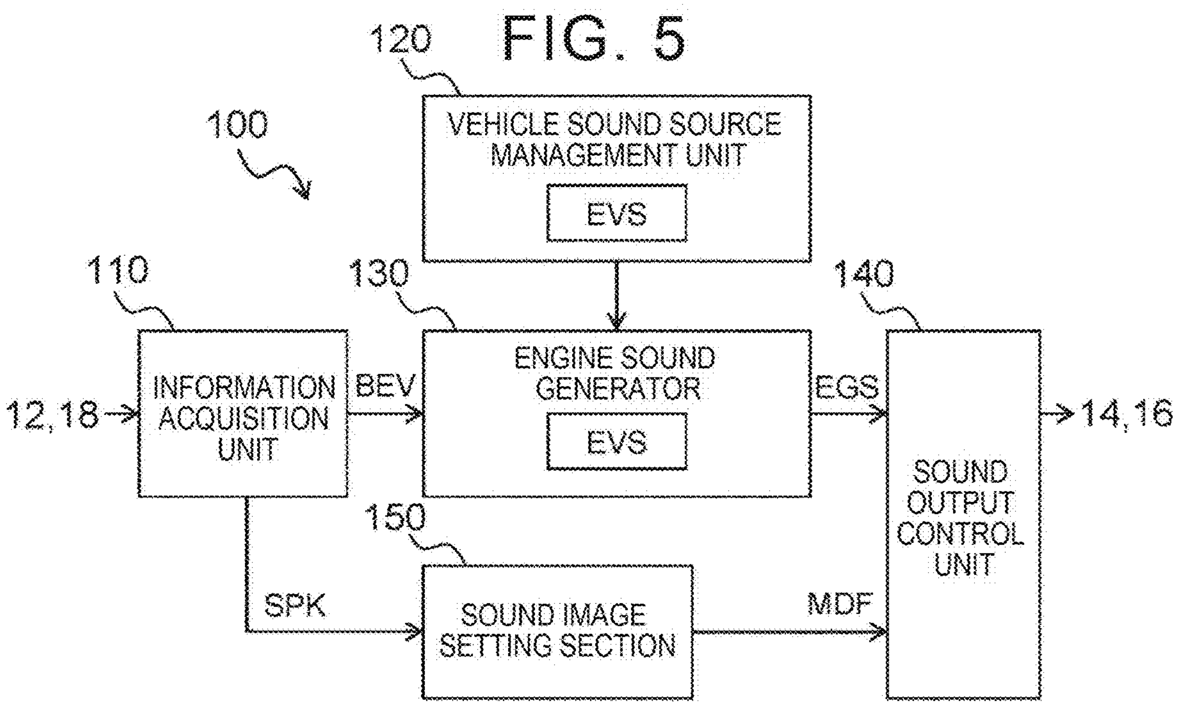
FIG. 5 is a block diagram illustrating an example of a functional configuration of a sound control device particularly related to the embodiment.

FIG. 5 is a block diagram illustrating an example of a functional configuration of the sound control device 100 particularly related to the embodiment. In the example illustrated in FIG. 5, the sound control device 100 includes a sound image setting unit 150 in addition to the functional blocks described in FIG. 3. These functional blocks are realized by, for example, cooperation of the processor 102 and the storage device 104.

The sound image setting unit 150 sets a sound image in the room of battery electric vehicle 10 based on the information SPK. The information SPK is information related to the settings of the first speaker 14 and the second speaker 16, and is an exemplary "sound image setting information" disclosed herein. The information SPK is included in input information from drivers acquired from HMI unit 18, for example.

Figure 6:
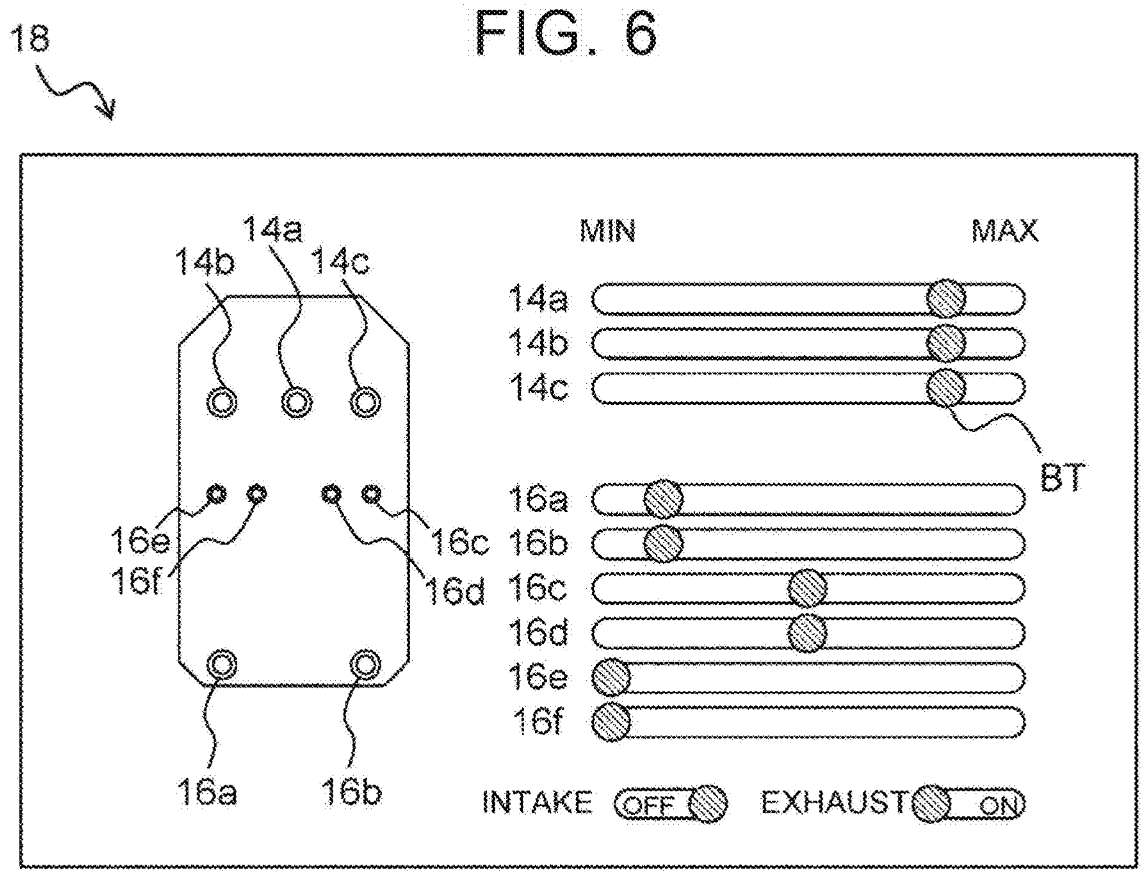
FIG. 6 is a diagram for explaining information related to setting of a speaker.

FIG. 6 is a diagram for explaining information related to setting of a speaker. In the embodiment illustrated in FIG. 6, HMI unit 18 includes a touch panel. A screen for setting the sound pressures of the first speaker 14 and the second speaker 16 is output to the touch panel. A vehicle-mounted position of each speaker is shown on the left side of the setting screen, and a sound pressure bar of each speaker is shown on the right side of the setting screen. The button BT shown above the sound pressure bar can slide laterally. Slide the button BT to the right to increase sound pressure, and slide the button BT to the left to decrease sound pressure. As described above, in the example illustrated in FIG. 6, the sound pressures of the first speaker 14 and the second speaker 16 are set by the driver.

Figure 7:
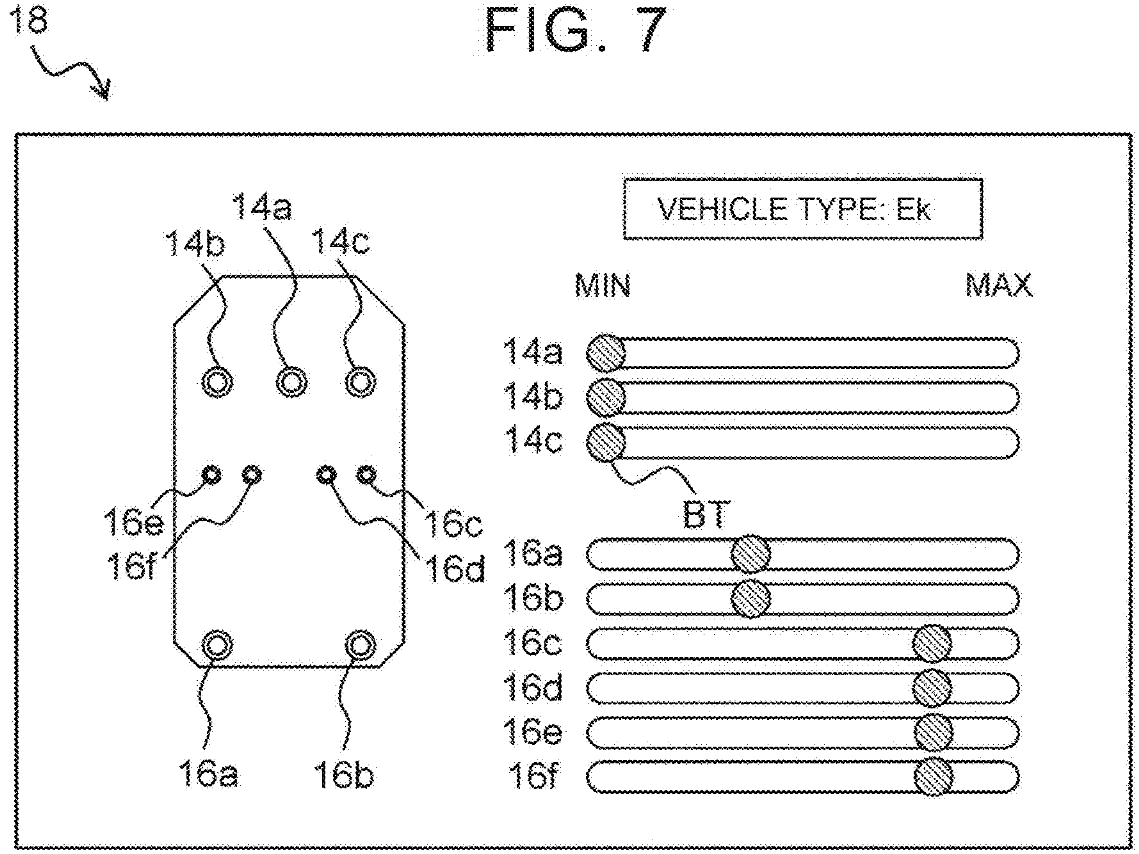
FIG. 7 is a diagram for explaining information related to setting of a speaker.

In another example, information relating to speaker settings is automatically generated based on information of an engine mounting position in a vehicle type specified by a driver. FIG. 7 is a diagram for explaining information SPK when a pseudo-engine sound is generated using the sound source data EVSk described with reference to FIG. 4. When the vehicle type Ek is designated by the driver, the default settings of the sound pressures of the first speaker 14 and the second speaker 16 are outputted to HMI unit 18 (touch panel) based on the information of the vehicle type Ek mounting position (for example, front, rear, mid-ship).

FIG. 7 shows a default setting when the vehicle type Ek is a midship engine vehicle. In the midship engine vehicle, since the engine is mounted in front of the rear wheel axle, in the default setting, the rear speakers 16*a* and 16*b* around the mounting position of the engine and the respective sound pressures of the seat speakers 16*c* to 16*f* are high. On the other hand, the sound pressure of the front-speakers 14*a* to 14*c* that is relatively far from the mounting position is low (lowest in FIG. 7). Drivers that specify the vehicle type Ek can adopt this default setting as it is. The driver can also adjust the default settings. For example, when there is no occupant in the passenger seat, the respective sound pressures of the seat speakers 16*e* and 16*f* can be lowered.

Figure 8:
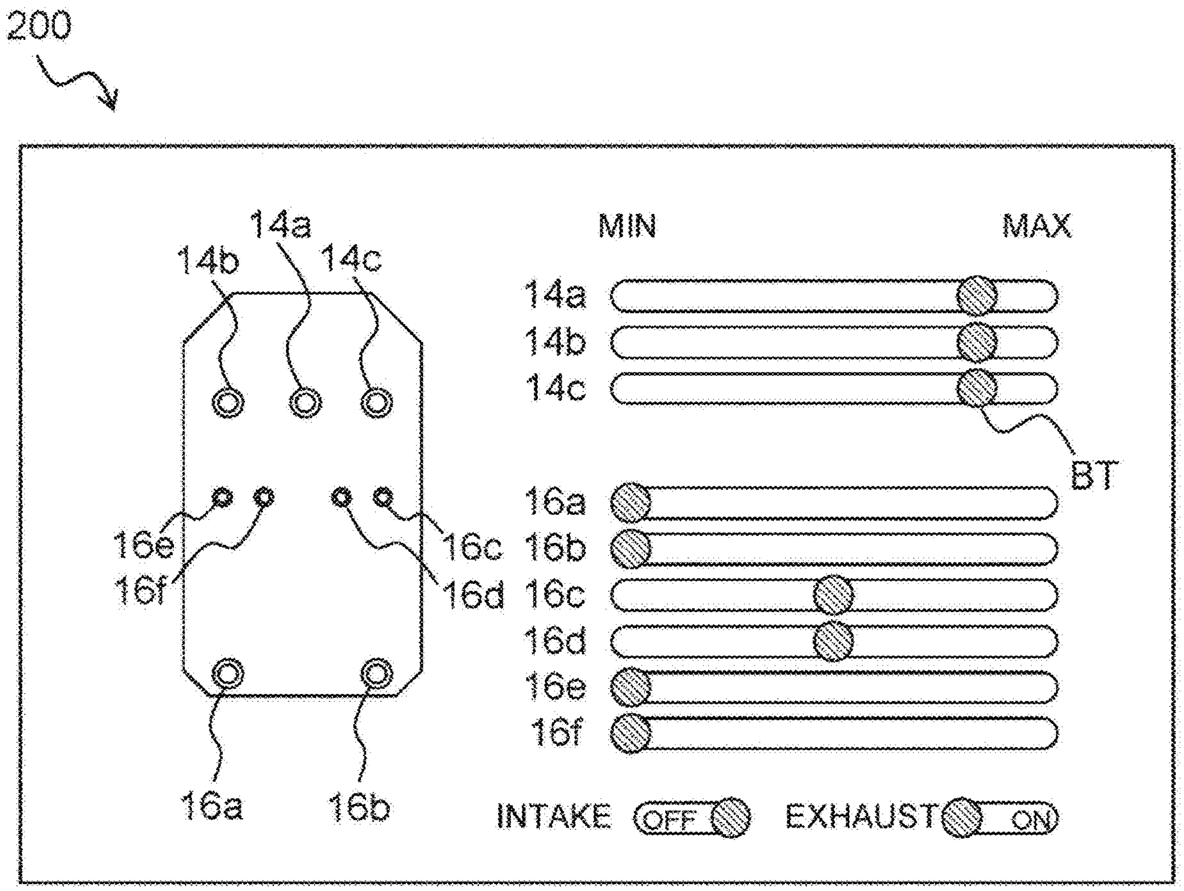
FIG. 8 is a diagram for explaining how to acquire information on setting of a speaker from an input/output terminal other than a HMI unit.

The information SPK may be acquired from an input/output terminal other than HMI unit 18. FIG. 8 is a diagram for explaining how to acquire the information SPK from the user terminal 200. The user terminal 200 illustrated in FIG. 8 is a terminal (for example, a smart phone or a tablet) carried by a driver or a battery electric vehicle 10 occupant. The user terminal 200 is configured to be able to communicate with the sound control device 100. By launching a predetermined application in the user terminal 200, a setting screen similar to the setting screen output to HMI unit 18 is output to the display unit of the user terminal 200. By outputting the setting window to the display unit, the drivers can set the speakers without passing through HMI unit 18. In addition, the occupant of battery electric vehicle 10 can change the setting of the sound image around the seat of the occupant to the setting of his/her preference.

Also shown in FIGS. 6 and 8 are information regarding the setting of the engine intake sound and the engine exhaust sound below the setting screen. This information sets whether or not the pseudo engine intake sound and the pseudo engine exhaust sound can be superimposed on the pseudo engine sound. When the superimposition setting of the engine intake sound is performed, the simulated engine intake sound simulating the engine intake sound is superimposed on the simulated engine sound outputted from the first speaker 14 (that is, the front speakers 14*a*, 14*b* and 14*c*). When the superimposition setting of the engine exhaust sound is performed, the simulated engine exhaust sound simulating the engine exhaust sound is superimposed on the simulated engine sound outputted from the rear speakers 16*a* and 16*b*. The superposition of the pseudo engine exhaust sound may be performed on the pseudo engine sound outputted from the seat speakers 16*c* to 16*f*. The superposition processing of the pseudo engine intake sound and the pseudo engine exhaust sound is performed in the engine sound generation unit 130.

When the sound image in the room of battery electric vehicle 10 is set, the sound image setting unit 150 transmits the sound pressure adjustment information MDF of the respective speakers to the sound output control unit 140.

The sound output control unit 140 outputs the engine sound data EGS received from the engine sound generation unit 130 from the speaker 14. The functions described above are the same as those described with reference to FIG. 3. When the sound pressure adjustment information MDF is received from the sound image setting unit 150, the sound output control unit 140 adjusts the sound pressure of the pseudo engine sound output from the respective speakers based on the sound pressure adjustment information MDF, and outputs the engine sound data EGS to the first speaker 14 and the second speaker 16. The sound pressure is adjusted by, for example, controlling the amplifiers of the first speaker 14 and the second speaker 16.

3. Sound Control Process

Figure 9:
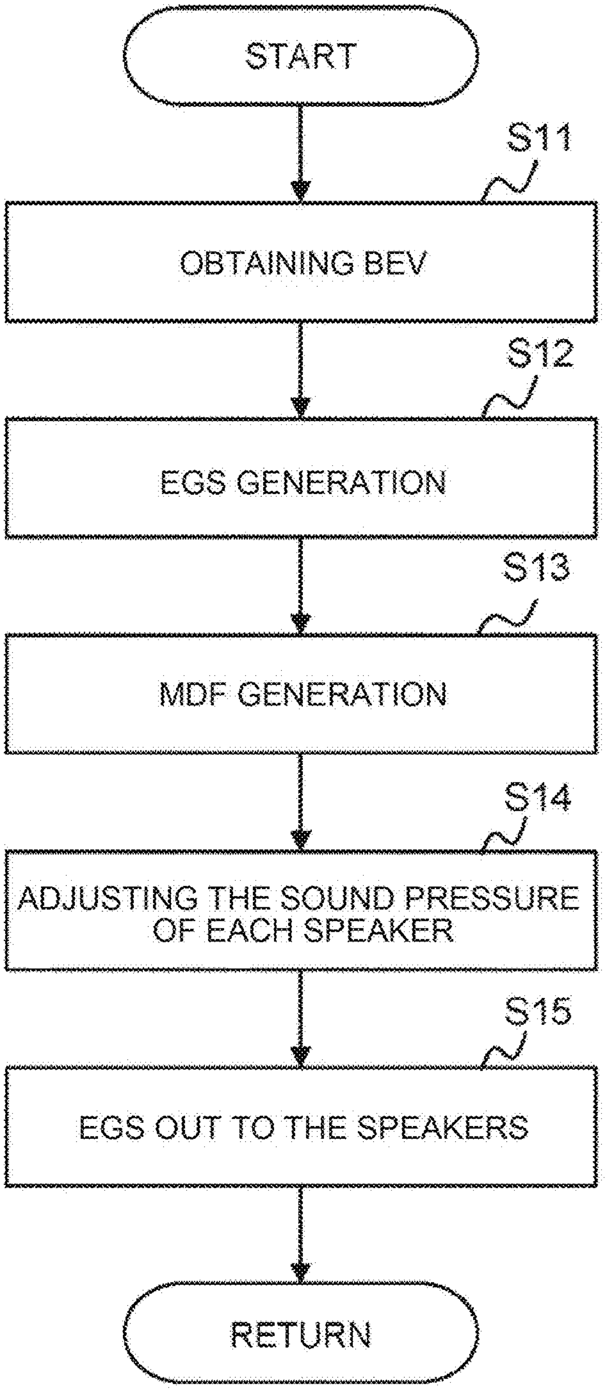
FIG. 9 is a flowchart illustrating a flow of a sound control process particularly related to the embodiment.

FIG. 9 is a flowchart illustrating a flow of a sound control process particularly related to the embodiment. The flowchart illustrated in FIG. 9 is repeatedly executed by the processor 102 illustrated in FIG. 1 at a predetermined control cycle.

In the routine shown in FIG. 9, first, an information BEV is obtained (S11). As described above, the information BEV includes information about the driving condition of battery electric vehicle 10, information about the driving environment of battery electric vehicle 10, input information from the drivers of battery electric vehicle 10, virtual engine speed Ne, and the like.

Following S11 process, an engine sound data EGS is generated (S12). The engine sound data EGS is generated based on the virtual engine speed Ne and the vehicle speed acquired by S11 process. When the information on the vehicle type of the engine vehicle designated by the driver is obtained in S11 process, the engine sound data EGS is generated by combining the information on the vehicle type with the information on the virtual engine speed Ne and the vehicle speed.

Following S12 process, a sound pressure adjustment information MDF is generated (S13). The sound pressure adjustment information MDF is generated based on the input information from the drivers obtained in S11 process. The input data from the drivers may be input via HMI unit 18 or may be input via the user terminal 200. When the occupant of battery electric vehicle 10 carries the user terminal 200, the sound pressure adjustment information MDF is generated based on the input information from the drivers and the input information from the occupants.

Following S13 process, the sound pressure of the pseudo-engine sound outputted from the respective speakers is adjusted (S14). The sound pressure is adjusted based on the sound pressure adjustment information MDF generated in S13 process. Following S14 process, the engine sound data EGS is outputted to the first speaker 14 and the second speaker 16 (S15).

4. Effects

According to the embodiment, the engine sound data EGS is outputted from the first speaker 14 and the second speaker 16. Therefore, it is possible to provide battery electric vehicle 10 drivers with a sense of realism such as driving a real-world engine-vehicle. In addition, the sound pressure of the pseudo-engine sound outputted from the speakers is adjusted based on the sound pressure adjustment information MDF. Therefore, it is possible to enhance the sense of presence by the output as compared with the case where the pseudo engine sound is simply output from the first speaker 14 and the second speaker 16.

5. Applications to Battery Electric Vehicle with Manual-Mode

An electric motor used as a driving power device in a typical battery electric vehicle differs greatly from an internal combustion engine used as a driving power device in a conventional engine. Due to differences in the torque-characteristics of power systems, conventional motor vehicles require transmissions, whereas battery electric vehicle generally do not include transmissions. Also, a typical battery electric vehicle does not include a manual transmission operated by drivers. Therefore, there is a great difference in driving sensation between the driving of MT vehicles and the driving of battery electric vehicle.

On the other hand, the electric motor can relatively easily control the torque by controlling the applied voltage and field. Therefore, in the electric motor, it is possible to obtain a desired torque characteristic within the operating range of the electric motor by performing appropriate control. Taking advantage of this feature, the torque of battery electric vehicle can be controlled to simulate torque properties specific to MT vehicles. It is also possible to provide battery electric vehicle with a pseudo-manual transmission so that drivers can obtain driving sensations such as MT powered vehicles. As a result, MT vehicles can be simulated in battery electric vehicle.

In embodiments, the power of the electric motor 44 may be controlled to simulate torque-characteristics specific to MT engine-vehicle. By controlling the power of the electric motor 44, the drivers of battery electric vehicle 10 can feel as if they are driving MT vehicles. The control mode of the electric motor 44 for simulating the torque-characteristics specific to MT engine-vehicle is hereinafter also referred to as "manual mode". The control mode of the electric motor 44 for operating battery electric vehicle 10 as a common battery electric vehicle is hereinafter also referred to as "auto mode".

Hereinafter, a configuration of a battery electric vehicle 10 including a manual mode will be described.

5-1. First Configuration Example

Figure 10:
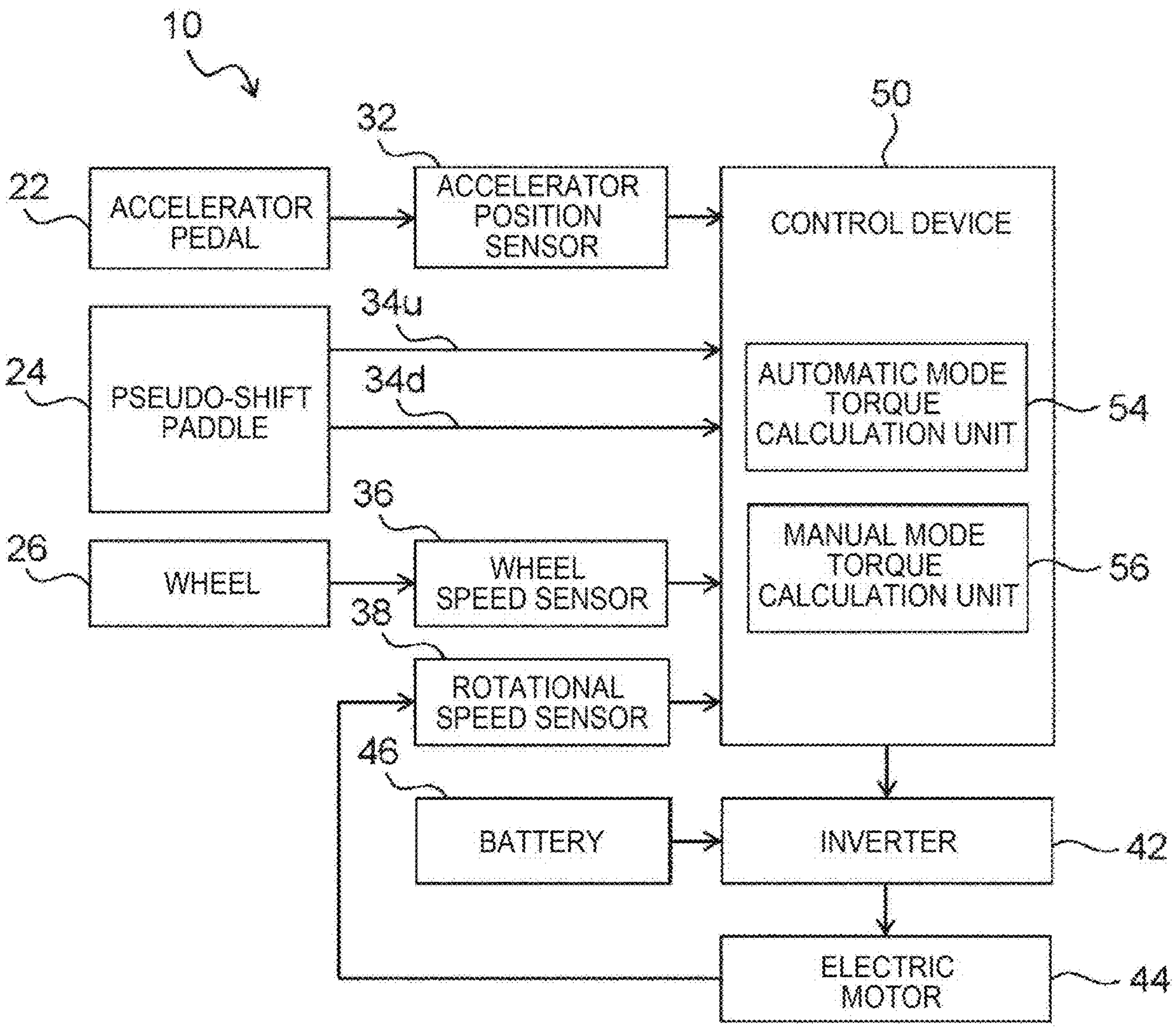
FIG. 10 is a diagram illustrating a first exemplary configuration of a power control system of battery electric vehicle.

FIG. 10 is a diagram illustrating a first exemplary configuration of a power control system of battery electric vehicle 10. Battery electric vehicle 10 comprises an electric motor 44, a battery 46 and inverters 42. The electric motor 44 is a driving power device. The battery 46 stores electrical energy that drives the electric motor 44. That is, battery electric vehicle 10 is a battery electric vehicle (BEV) that runs with the electric energy stored in the battery 46. The inverter 42 converts DC power input from the battery 46 into drive power of the electric motor 44 at the time of acceleration. In addition, the inverter 42 converts the regenerative power input from the electric motor 44 into DC power at the time of deceleration, and charges the battery 46.

Battery electric vehicle 10 comprises an accelerator pedal 22 for the driver to enter an acceleration demand for battery electric vehicle 10. The accelerator pedal 22 is provided with an accelerator position sensor 32 for detecting an accelerator operation amount.

Battery electric vehicle 10 comprises a pseudo-shift paddle 24. This pseudo-shift paddle 24 is a different dummy than the original paddle shifter. The pseudo-shift paddle 24 is structured to resemble a shift paddle of a clutch-pedal-less MT engine-vehicle. The pseudo-shift paddle 24 is mounted on a steering wheel. The pseudo-shift paddle 24 comprises an upshift switch and a downshift switch for determining the operating position. The upshift switch is pulled forward to emit an upshift signal 34*u*, and the downshift switch is pulled forward to emit a downshift signal 34*d*.

Battery electric vehicle 10 wheel 26 is provided with a wheel speed sensor 36. The wheel speed sensor 36 is used as a vehicle speed sensor for detecting the vehicle speed of battery electric vehicle 10. Further, the electric motor 44 is provided with a rotational speed sensor 38 for detecting the rotation speed thereof.

Battery electric vehicle 10 includes a control device 50. The control device 50 is typically an electronic control unit (ECU) mounted on a battery electric vehicle 10. The control device 50 may be a combination of a plurality of ECU. The control device 50 includes an interface, a memory, and a processor. An in-vehicle network is connected to the interface. The memories include a RAM for temporarily recording data, and a ROM for storing programs executable by the processor and various data related to the programs. The program is composed of a plurality of instructions. The processor reads and executes a program and data from a memory, and generates a control signal based on a signal acquired from each sensor.

For example, the control device 50 controls the electric motor 44 by PWM control of the inverters 42. A signal from the accelerator position sensor 32, the pseudo shift paddle 24, the wheel speed sensor 36, and the rotational speed sensor 38 (the signal from the pseudo shift paddle 24 is the upshift signal 34*u* and the downshift signal 34*d*) is inputted to the control device 50. The control device 50 processes these signals and calculates a motor torque command for PWM controlling the inverters 42.

The control device 50 includes an automatic mode and a manual mode as control modes. Automated mode is a normal control mode for operating a battery electric vehicle 10 as a common battery electric vehicle. The automatic mode is programmed to continuously change the output of the electric motor 44 in response to operation of the accelerator pedal 22. On the other hand, the manual mode is a control mode for operating battery electric vehicle 10 like a MT engine-vehicle. The manual mode is programmed to vary the output characteristics of the electric motor 44 for operation of the accelerator pedal 22 in response to upshift and downshift operations on the pseudo-shift paddle 24. That is, the manual mode is a control mode in which the output of the electric motor 44 can be changed in response to a driving operation of a manual driving element other than the accelerator pedal 22 and the brake pedal. The automatic mode and the manual mode can be switched.

The control device 50 comprises an automatic mode torque calculation unit 54 and a manual mode torque calculation unit 56. The units 54 and 56 may be independent ECU or ECU functions obtained by executing programs stored in memories on a processor.

The automatic mode torque calculation unit 54 has the function of calculating the motor torque when the electric motor 44 is controlled in the automatic mode. The automatic mode torque calculation unit 54 stores a motor torque command map. The motor torque command map is a map for determining the motor torque from the accelerator operation amount and the rotational speed of the electric motor 44. A signal of the accelerator position sensor 32 and a signal of the rotational speed sensor 38 are input to each parameter of the motor torque command map. The motor torque corresponding to these signals is output from the motor torque command map. Therefore, in the automatic mode, even if the driver operates the pseudo-shift paddle 24, the operation is not reflected in the motor torque.

The manual mode torque calculation unit 56 comprises a MT engine-vehicle model. MT engine vehicle model is a model for calculating the drive wheel torque that would be obtained by operating the accelerator pedal 22 and the pseudo-shift paddle 24 assuming that battery electric vehicle 10 is a MT engine vehicle.

Figure 11:
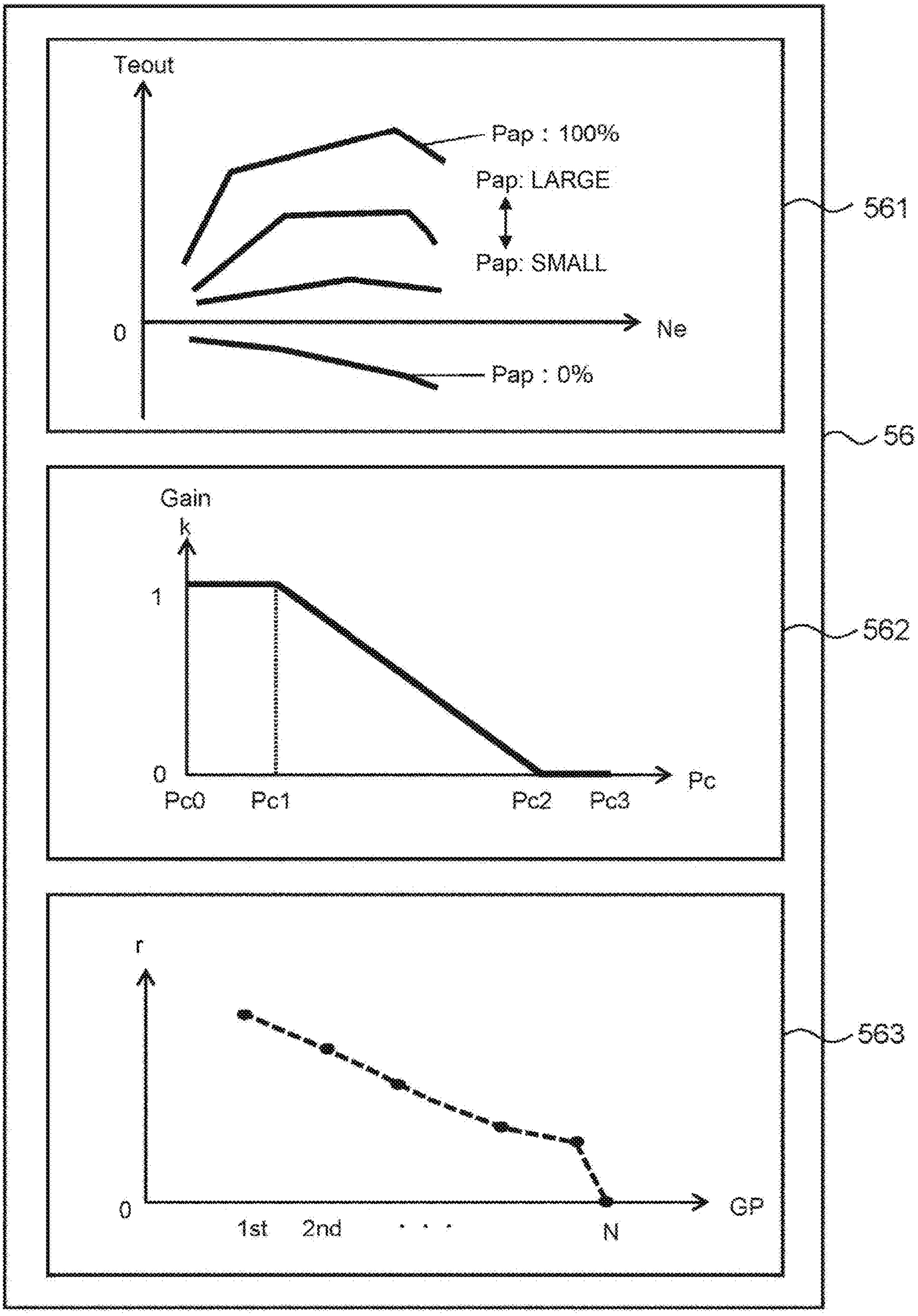
FIG. 11 is a diagram illustrating an engine model, a clutch model, and a transmission model constituting a MT engine vehicle model.

Referring to FIG. 11, a MT engine-vehicle model included in the manual mode torque calculation unit 56 will be described. As shown in FIG. 11, MT engine vehicle model includes an engine model 561, a clutch model 562, and a transmission model 563. The engine, the clutch, and the transmission virtually realized by MT engine vehicle model are referred to as a virtual engine, a virtual clutch, and a virtual transmission, respectively. In the engine model 561, a virtual engine is modeled. In the clutch model 562, a virtual clutch is modeled. In the transmission model 563, a virtual transmission is modeled.

The engine model 561 calculates a virtual engine speed Ne and a virtual engine power torque Teout. The virtual engine rotational speed Ne is calculated based on the rotational speed Nw of the wheel, the overall reduction ratio R, and the slip-rate Rslip of the virtual clutch. For example, the virtual engine-speed Ne is expressed by the following equation (1).

$$Ne=Nw\times R/(1-R\text{slip}) \qquad \text{Expression (1):}$$

The virtual engine output torque Teout is calculated from the virtual engine speed Ne and the accelerator operation amount Pap. In calculating the virtual engine output torque Teout, as shown in FIG. 11, a map that defines the relation between the accelerator operation amount Pap, the virtual engine speed Ne, and the virtual engine output torque Teout is used. In this map, the virtual engine output torque Teout with respect to the virtual engine speed Ne is given for each accelerator operation amount Pap. The torque characteristic shown in FIG. 11 may be set to a characteristic assumed for a gasoline engine, or may be set to a characteristic assumed for a diesel engine. In addition, the torque characteristics may be set to characteristics assumed for a natural intake engine, or may be set to characteristics assumed for a supercharged engine.

The clutch model 562 calculates a torque transmission gain k. The torque transmission gain k is a gain for calculating a torque transmission degree of the virtual clutch according to the virtual clutch operation amount Pc. The virtual clutch operation amount Pc is typically 0% and is temporarily opened to 100% in conjunction with the switching of the virtual gear stages of the virtual transmission. The clutch model 562 has a map as shown in FIG. 11. In this map, the torque transmission gain k is given to the virtual clutch operation amount Pc. In FIG. 11, Pc0 corresponds to a position where the virtual clutch operation amount Pc is 0%, and Pc3 corresponds to a position where the virtual clutch operation amount Pc is 100%. The range from Pc0 to Pc1 and the range from Pc2 to Pc3 are dead zones in which the torque transmission gain k does not change depending on the virtual clutch operation amount Pc. The clutch model 562 calculates the clutch output torque Tcout using the torque transmission gain k. The clutch output torque Tcout is torque output from the virtual clutch. For example, the clutch output torque Tcout is given by the product of the virtual engine output torque Teout and the torque transfer gain k (Tcout=Teout×k).

In addition, the clutch-model 562 calculates the slip-rate Rslip. The slip-rate Rslip is used to calculate the virtual engine speed Ne in the engine model 561. The slip ratio Rslip can be calculated using a map in which the slip ratio Rslip is given to the virtual clutch operation amount Pc in the same manner as the torque transmission gain k.

The transmission model 563 calculates a gear ratio r. The gear ratio r is a gear ratio determined by the virtual gear stage GP in the virtual transmission. After the pseudo-shift paddle 24 is upshifted, the virtual gear stage GP is raised by one stage. On the other hand, the virtual gear stage GP is lowered by one stage in response to the downshift of the pseudo-shift paddle 24. The transmission model 563 has a map as shown in FIG. 11. In this map, the gear ratio r is given to the virtual gear stage GP such that the larger the virtual gear stage GP, the smaller the gear ratio r. The transmission model 563 calculates the transmission output torque Tgout using the gear ratio r and the clutch output torque Tcout obtained from the map. For example, the transmission output torque Tgout is given by the product of the clutch output torque Tcout and the gear ratio r (Tgout=Tcout×r). The transmission output-torque Tgout changes discontinuously in response to the change of the gear ratio r. This discontinuous change in the transmission output-torque Tgout causes a shift-shock, which results in the appearance of a vehicle equipped with a stepped transmission.

MT engine-vehicle model calculates the drive wheel torque Tw using a predetermined reduction ratio rr. The reduction ratio rr is a fixed value determined by the mechanical structure from the virtual transmission to the drive wheels. The overall reduction ratio R described above is obtained by multiplying the reduction ratio rr by the gear ratio r. MT engine vehicle model calculates the drive wheel torque Tw from the transmission output torque Tgout and the reduction ratio rr. For example, the drive wheel torque Tw is given by the product of the transmission power torque Tgout and the reduction ratio rr (Tw=Tgout×rr).

The control device 50 converts the drive wheel torque Tw calculated by MT engine-vehicle model into the required motor torque Tm. The required motor torque Tm is the motor torque required to realize the drive wheel torque Tw calculated by MT engine-vehicle model. In order to convert the drive wheel torque Tw into the required motor torque Tm, the reduction ratio from the output shaft of the electric motor 44 to the drive wheels is used. Then, the control device 50 controls the inverter 42 in accordance with the required motor torque Tm to control the electric motor 44.

Figure 12:
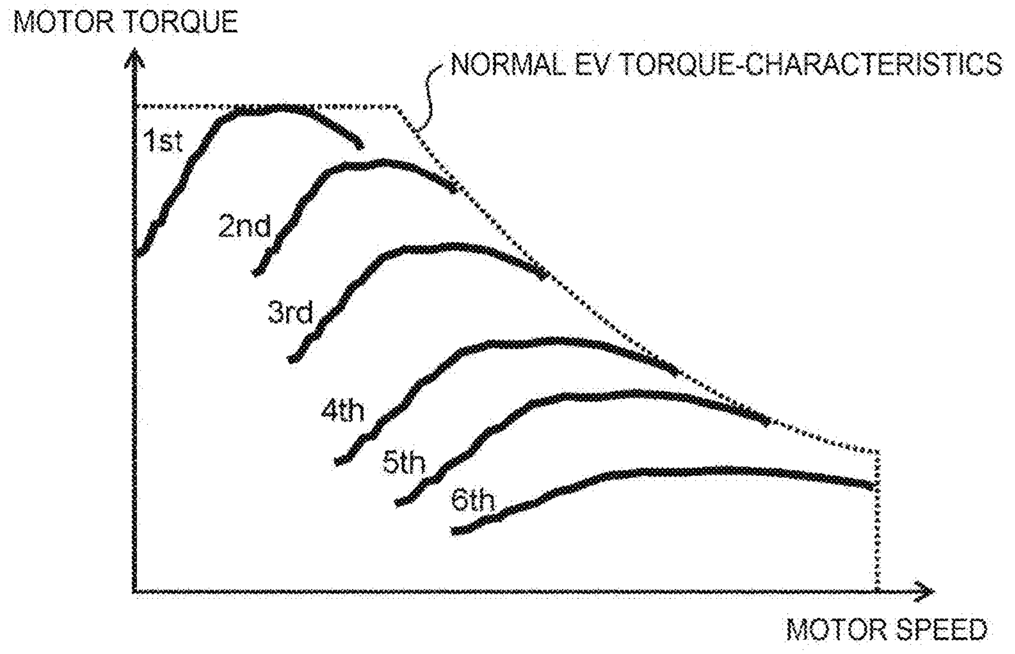
FIG. 12 is a diagram showing torque characteristics of an electric motor realized by motor control using a MT engine-vehicle model compared with torque characteristics of an electric motor realized by normal motor control as a battery electric vehicle.

FIG. 12 is a diagram showing torque characteristics of an electric motor 44 realized by motor control using a MT engine-vehicle model compared with torque characteristics of an electric motor 44 realized by normal motor control as a battery electric vehicle (EV). According to the motor control using MT engine vehicle model, as shown in FIG. 12, a torque characteristic (solid line in the drawing) that simulates the torque characteristic of MT engine vehicle can be realized in accordance with the virtual gear stage set by the pseudo-shift paddle 24. In FIG. 12, the number of gear stages is six.

5-2. Second Configuration Example

Figure 13:
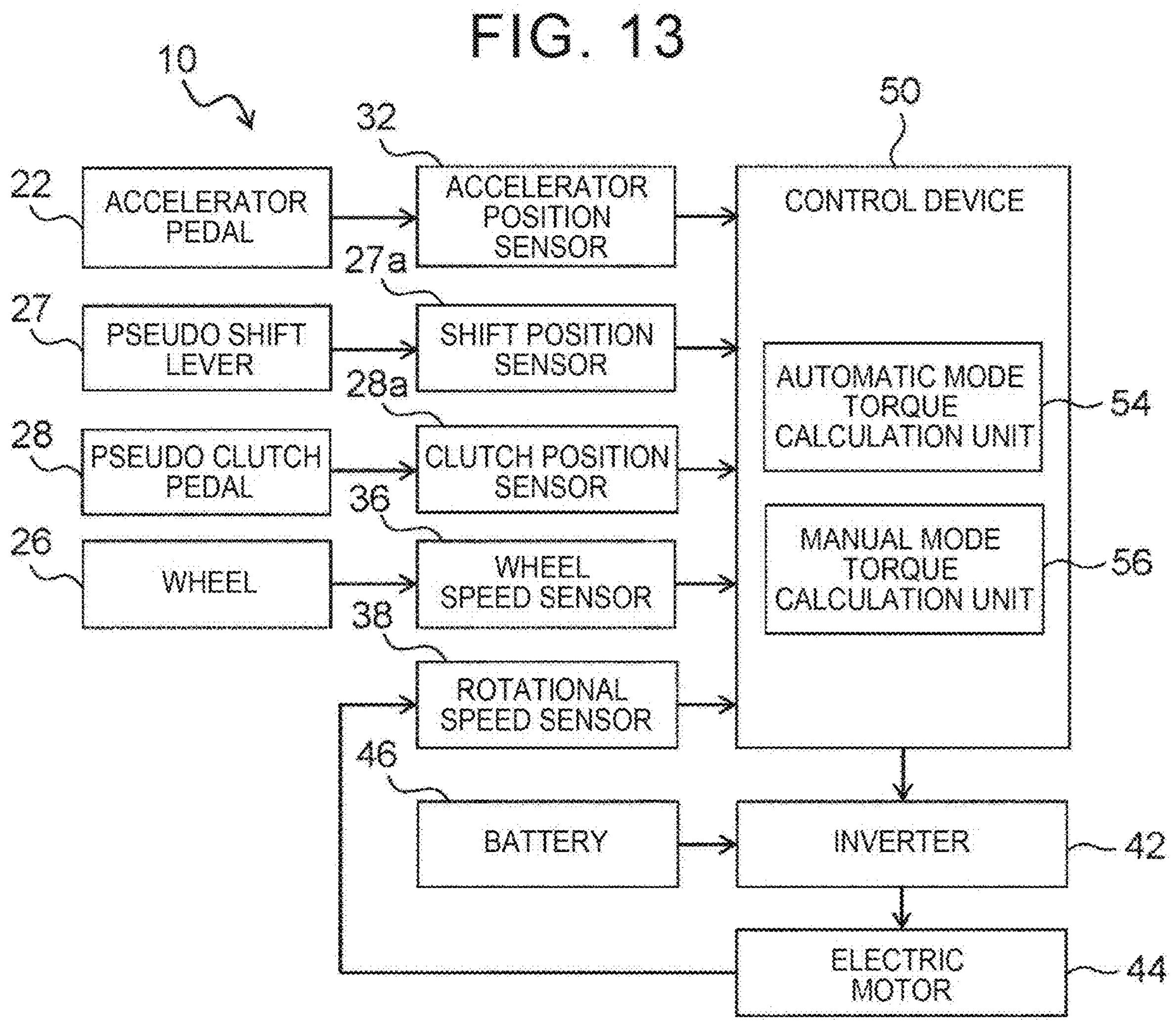
FIG. 13 is a diagram illustrating a second exemplary configuration of the power control system of battery electric vehicle.

FIG. 13 is a diagram illustrating a second exemplary configuration of the power control system of battery electric vehicle 10. Here, only a configuration different from the above-described first configuration example will be described. Specifically, in the second configuration example, battery electric vehicle 10 includes the pseudo shift lever 27 and the pseudo clutch pedal 28 instead of the pseudo shift paddle 24 provided in the first configuration example. The pseudo shift lever 27 and the pseudo clutch pedal 28 are dummies different from the original shift lever and the clutch pedal.

The pseudo-shift lever 27 simulates a shift lever included in a MT engine-vehicle. The arrangement and operating feel of the pseudo-shift lever 27 are equivalent to those of actual MT vehicles. The pseudo shift lever 27 is provided with, for example, positions corresponding to the gear stages of 1 speed, 2 speed, 3 speed, 4 speed, 5 speed, 6 speed, reverse speed, and neutral. The pseudo shift lever 27 is provided with a shift position sensor 27*a* that detects a gear stage by determining which position the pseudo shift lever 27 is in.

The pseudo clutch pedal 28 simulates a clutch pedal included in a MT vehicle. The arrangement and operating feel of the pseudo-clutch pedal 28 are equivalent to those of actual MT vehicles. The pseudo clutch pedal 28 is operated when the pseudo shift lever 27 is operated. That is, the driver depresses the pseudo clutch pedal 28 when it is desired to change the setting of the gear stage by the pseudo shift lever 27, and when the setting change of the gear stage is completed, the driver stops depressing and returns the pseudo clutch pedal 28 to its original state. The pseudo clutch pedal 28 is provided with a clutch position sensor 28*a* for detecting a depression amount of the pseudo clutch pedal 28.

The control device 50 receives signals from the accelerator position sensor 32, the shift position sensor 27*a*, the clutch position sensor 28*a*, the wheel speed sensor 36, and the rotational speed sensor 38. The control device 50 processes these signals and calculates a motor torque command for PWM controlling the inverters 42.

Similar to the first configuration example described above, the control device 50 includes an automatic mode and a manual mode as the control modes. The automatic mode is programmed to continuously change the output of the electric motor 44 in response to operation of the accelerator pedal 22. On the other hand, the manual mode is a control mode for operating battery electric vehicle 10 like a MT engine-vehicle. The manual mode is programmed to change the output of the electric motor 44 to the operation of the accelerator pedal 22 in response to the operation of the pseudo clutch pedal 28 and the pseudo shift lever 27. That is, the manual mode is a control mode in which the output of the electric motor 44 can be changed in response to a driving operation of the accelerator pedal 22 or a manual driving element other than the brake pedal.

The vehicle model included in the manual mode torque calculation unit 56 is similar to that shown in FIG. 11. However, the virtual clutch operation amount Pc is replaced with the depression amount of the pseudo clutch pedal 28 detected by the clutch position sensor 28*a*. The virtual gear stage GP is determined by the position of the pseudo-shift lever 27 detected by the shift position sensor 27*a*.

What is claimed is:

1. A sound control method to be applied to a battery electric vehicle that uses an electric motor as a power unit for travel, comprising:

generating a pseudo engine sound based on operation information for a manual driving element of the battery electric vehicle; and outputting the pseudo engine sound from a plurality of speakers provided in a cabin of the battery electric vehicle, wherein the speakers include a first speaker provided at a front portion of the battery electric vehicle, and a second speaker provided at a location other than the front portion, the outputting of the pseudo engine sound further includes adjusting respective sound pressures of the pseudo engine sounds output from the first speaker and the second speaker based on sound image setting information for the battery electric vehicle, the second speaker includes a rear speaker provided at a rear portion of the battery electric vehicle, and the outputting of the pseudo engine sound further includes superimposing a pseudo engine intake sound on the pseudo engine sound output from the first speaker, and superimposing a pseudo engine exhaust sound on the pseudo engine sound output from the rear speaker.

2. The method according to claim 1, wherein:

the generating of the pseudo engine sound includes generating the pseudo engine sound from sound source data for an engine vehicle designated from among a plurality of vehicle types;

the sound image setting information includes information on a mounting position of an engine in the designated engine vehicle; and the adjusting of the sound pressures includes increasing the sound pressure of the pseudo engine sound output from a speaker provided around the mounting position in the battery electric vehicle.

3. The method according to claim 2, wherein the adjusting of the sound pressures includes reducing the sound pressure of the pseudo engine sound output from a speaker other than the speaker provided around the mounting position.

4. The method according to claim 1, further comprising changing the sound image setting information when a request to change the sound image setting information is received, wherein the change request is input from a terminal provided in the cabin of the battery electric vehicle or a terminal capable of communicating with the battery electric vehicle.

5. The method according to claim 1, wherein the manual driving element includes an accelerator pedal and a pseudo shift paddle that resembles a shift paddle of an engine vehicle.

6. The method according to claim 1, wherein the manual driving element includes an accelerator pedal, a pseudo clutch pedal that resembles a clutch pedal of an engine vehicle, and a pseudo shift lever that resembles a shift lever of an engine vehicle.

7. A sound control device to be applied to a battery electric vehicle that uses an electric motor as a power unit for travel, the sound control device comprising a processor configured to:

generate a pseudo engine sound based on operation information for a manual driving element of the battery electric vehicle; and output the pseudo engine sound from a plurality of speakers provided in a cabin of the battery electric vehicle, wherein the speakers include a first speaker provided at a front portion of the battery electric vehicle, and a second speaker provided at a location other than the front portion, the processor is further configured to adjust respective sound pressures of the pseudo engine sounds output from the first speaker and the second speaker based on sound image setting information for the battery electric vehicle, the second speaker includes a rear speaker provided at a rear portion of the battery electric vehicle, and the processor is further configured to superimpose a pseudo engine intake sound on the pseudo engine sound output from the first speaker, and superimpose a pseudo engine exhaust sound on the pseudo engine sound output from the rear speaker.

8. A battery electric vehicle that uses an electric motor as a power unit for travel, comprising:

a plurality of speakers provided in a cabin of the battery electric vehicle; and a processor configured to generate a pseudo engine sound based on operation information for a manual driving element of the battery electric vehicle, and output the pseudo engine sound to the speakers, wherein the speakers include a first speaker provided at a front portion of the battery electric vehicle, and a second speaker provided at a location other than the front portion, the processor is further configured to adjust respective sound pressures of the pseudo engine sounds output from the first speaker and the second speaker based on sound image setting information for the battery electric vehicle, the second speaker includes a rear speaker provided at a rear portion of the battery electric vehicle, and the processor is further configured to superimpose a pseudo engine intake sound on the pseudo engine sound output from the first speaker, and superimpose a pseudo engine exhaust sound on the pseudo engine sound output from the rear speaker.

* * * * *